US012467287B2

(12) United States Patent
Zhu

(10) Patent No.: US 12,467,287 B2
(45) Date of Patent: Nov. 11, 2025

(54) ANTI-THEFT HANGER

(71) Applicant: Nanning FuLian FuGui Precision Industrial Co., Ltd., Nanning (CN)

(72) Inventor: Xuan-Chu Zhu, Jincheng (CN)

(73) Assignee: Nanning FuLian FuGui Precision Industrial Co., Ltd., Nanning (CN)

( * ) Notice: Subject to any disclaimer, the term of this patent is extended or adjusted under 35 U.S.C. 154(b) by 149 days.

(21) Appl. No.: 18/594,151

(22) Filed: Mar. 4, 2024

(65) Prior Publication Data

US 2024/0384572 A1 Nov. 21, 2024

(30) Foreign Application Priority Data

May 17, 2023 (CN) ......................... 202310558396.0

(51) Int. Cl.
*E05B 73/00* (2006.01)
*A47F 5/08* (2006.01)

(52) U.S. Cl.
CPC ........ *E05B 73/0017* (2013.01); *A47F 5/0861* (2013.01)

(58) Field of Classification Search
CPC .... E05B 73/0017; E05B 69/02; A47F 5/0861; A47F 7/024; Y10T 70/5009; Y10T 70/5013; Y10T 70/5018; Y10T 70/5022; Y10T 70/5027; Y10T 70/50
USPC .............................................................. 70/57
See application file for complete search history.

(56) References Cited

U.S. PATENT DOCUMENTS

| | | | | |
|---|---|---|---|---|
| 5,689,978 | A * | 11/1997 | Eklof | E05B 69/02 70/58 |
| 6,966,165 | B2 | 11/2005 | Hernandez et al. | |
| 2005/0098462 | A1 | 5/2005 | Hernandez, Jr. et al. | |
| 2014/0071643 | A1 * | 3/2014 | Yang | E05B 73/0017 361/755 |
| 2024/0384572 | A1 * | 11/2024 | Zhu | A47F 5/0861 |

FOREIGN PATENT DOCUMENTS

| | | | | |
|---|---|---|---|---|
| CN | 1818308 | A | 8/2006 | |
| CN | 202580532 | U | 12/2012 | |
| CN | 205321928 | U | 6/2016 | |
| CN | 105193168 | B * | 9/2018 | A47F 5/0861 |
| CN | 111906739 | A | 11/2020 | |
| TW | 200519001 | A | 6/2005 | |
| TW | M314102 | U | 6/2007 | |
| TW | I323214 | B | 4/2010 | |

(Continued)

*Primary Examiner* — Suzanne L Barrett
(74) *Attorney, Agent, or Firm* — ScienBiziP, P.C.

(57) ABSTRACT

An anti-theft hanger is composed of an inner shell, which includes a fixed plate, a side wall is positioned on the fixed plate and surrounds it, a hanging hook on the fixed plate, and a latch on the side wall. Within the inner shell, there is a drive module, and the activation switch of the drive module is securely positioned on the side wall, and the activation switch is exposed on the side wall. A locking plate is affixed to the hanging hook and connected to the drive module, allowing it to receive rotational motion from the drive module. An outer shell is placed over the inner shell, and a side surface of the outer shell features limit slot that allow the latch to move. An elastic component connects the inner shell to the outer shell, restricting their relative movement distance.

15 Claims, 10 Drawing Sheets

(56) References Cited

FOREIGN PATENT DOCUMENTS

| | | | | |
|---|---|---|---|---|
| TW | M397207 | U | 2/2011 | |
| TW | 201310444 | A1 | 3/2013 | |
| WO | WO-2013157489 | A1 * | 10/2013 | ............ F16B 45/027 |

* cited by examiner

ANTI-THEFT HANGER

FIELD

The subject matter herein generally relates to connecting or securing items, particularly an anti-theft hanger.

BACKGROUND

In places such as plazas, malls, stations, living rooms, bedrooms, exhibition halls, etc., clocks, valuable picture frames, routers, or cameras are often hung on walls to beautify the environment or provide various functional tools (such as timekeeping, surveillance, or wireless network tools).

Currently, the most common tool for hanging items is nails. Most often, nails are directly hammered into the wall to provide a point of support for hanging items. However, conventional nails only serve the purpose of hanging and supporting items, without providing any locking function. This makes it easy for anyone to remove the hung item, posing a risk of theft to the hung item.

Therefore, there is currently an urgent need for a hanger that is theft-proof, tamper-proof, and easily removable. Designing an anti-theft hanger with the mentioned functionalities would effectively address the aforementioned issues.

BRIEF DESCRIPTION OF THE DRAWINGS

Many aspects of the present disclosure are better understood with reference to the following drawings. The components in the drawings are not necessarily drawn to scale, the emphasis instead being placed upon clearly illustrating the principles of the present disclosure. It will be appreciated that for simplicity and clarity of illustration, where appropriate, reference numerals have been repeated among the different figures to indicate corresponding or analogous elements.

DETAILED DESCRIPTION

Figure 1:
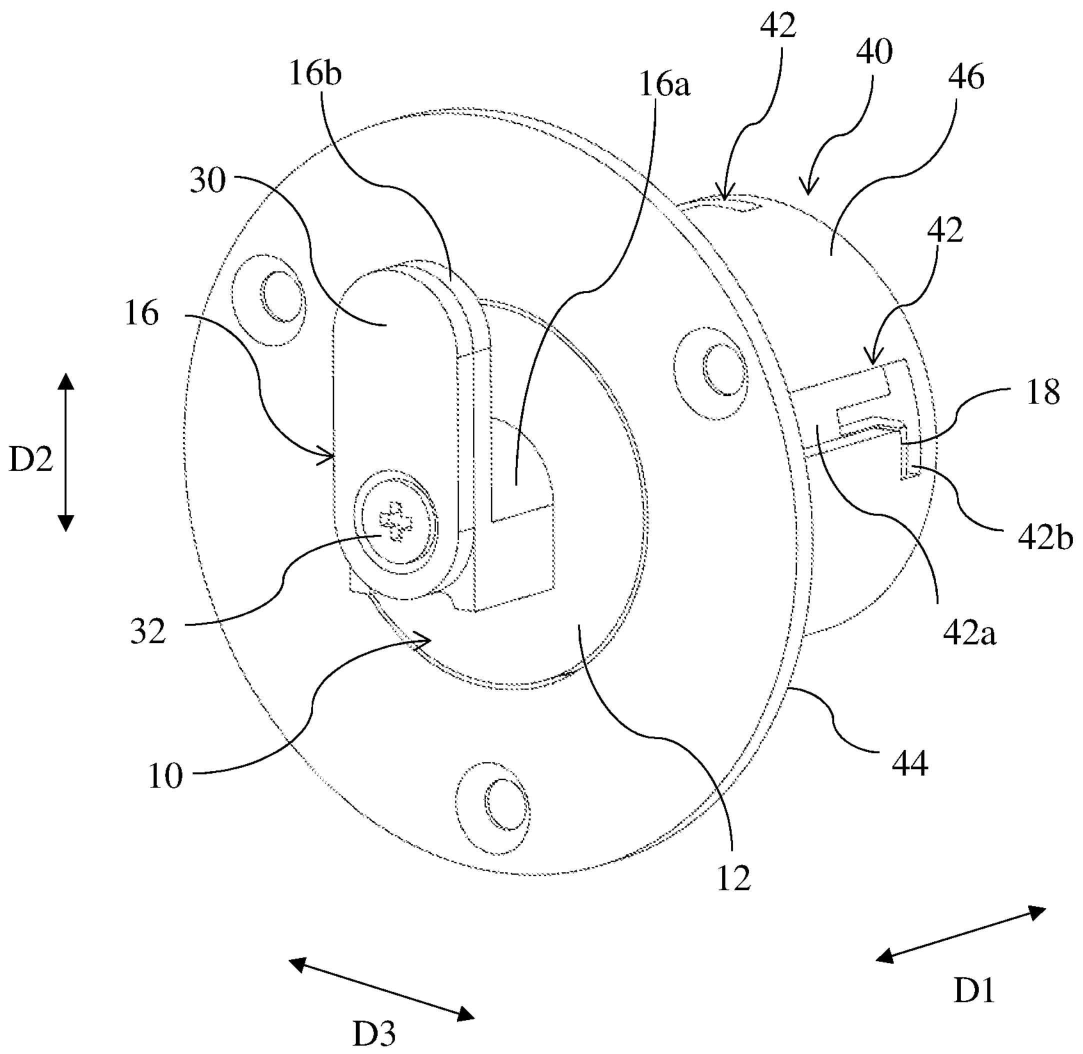
FIG. 1 is a perspective view of an embodiment of an anti-theft hanger of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one".

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to;" it specifically indicates open-ended inclusion or membership in the so-described combination, group, series, and the like.

Figure 2:
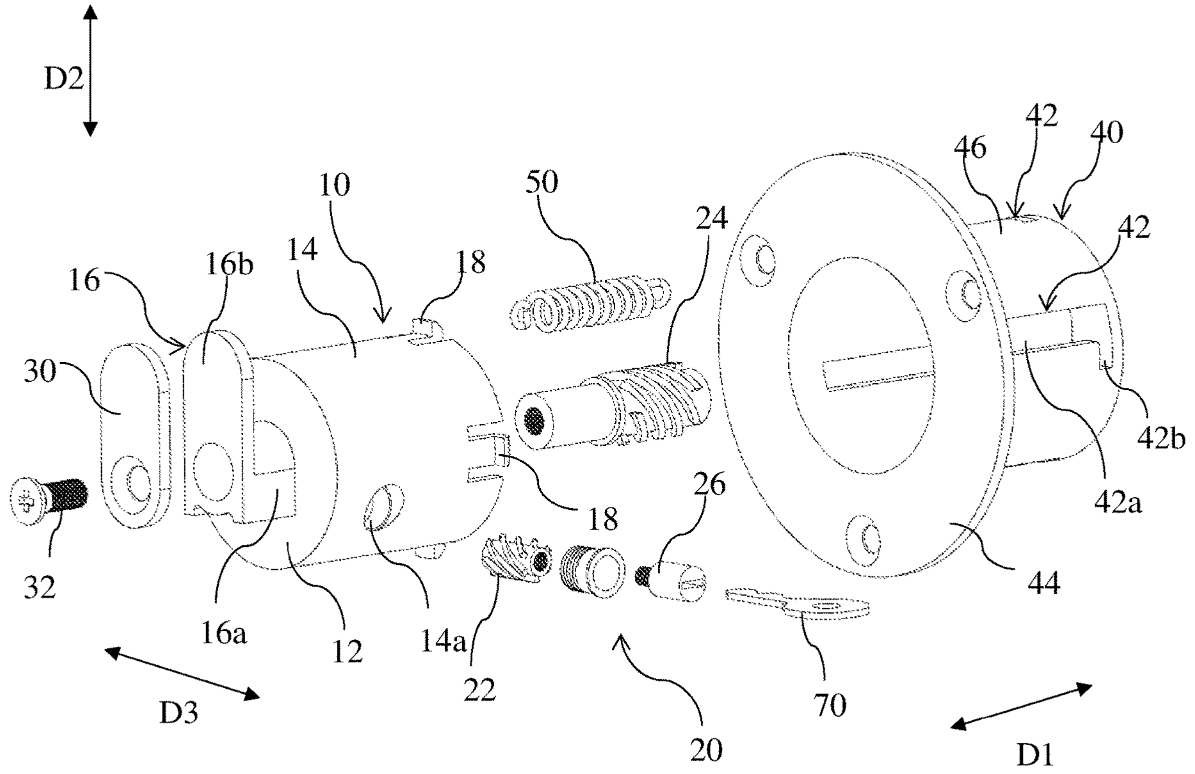
FIG. 2 is an exploded view of a component of the anti-theft hanger shown in FIG. 1.

Please refer to FIG. 1 and FIG. 2. The present invention provides an anti-theft hanger, comprising an inner shell 10, a drive module 20, a locking plate 30, an outer shell 40, and an elastic element 50.

The inner shell 10 comprises a fixed plate 12 and a side wall 14. The side wall 14 encircle the fixed plate 12, and the side wall 14 can extend vertically or substantially vertically from the fixed plate 12, extending along the first direction D1. Substantially vertical includes vertical or angles ranging from 70 to 100 degrees. A hanging hook 16 is positioned on the fixed plate 12. The hanging hook 16 includes a hanging portion 16*a* and a blocking portion 16*b*. The hanging portion 16*a* extends outward from the inner shell 10, with the hanging portion 16*a* extending along the first direction D1. The blocking portion 16*b* is vertically positioned on the hanging portion 16*a*, and extends along the second direction D2. The first direction is perpendicular to the second direction D2. In this embodiment, one end of the blocking portion 16*b*, which is not connected to the hanging portion 16*a*, has a curved edge. The shape of the blocking portion 16*b* can resemble a bar, plate, elongated plate, or tongue shape. At least a latch 18 is installed on the side wall 14. In this embodiment, the latch 18 can extend vertically or substantially vertically from the side wall 14 towards the outer side of the inner shell 10. Substantially vertical here includes vertical or angles ranging from 70 to 100 degrees. The latch 18 can also be two or more, with at least two latch 18 equidistantly placed on the side wall 14, and it is not limited to only one latch 18.

Figure 3:
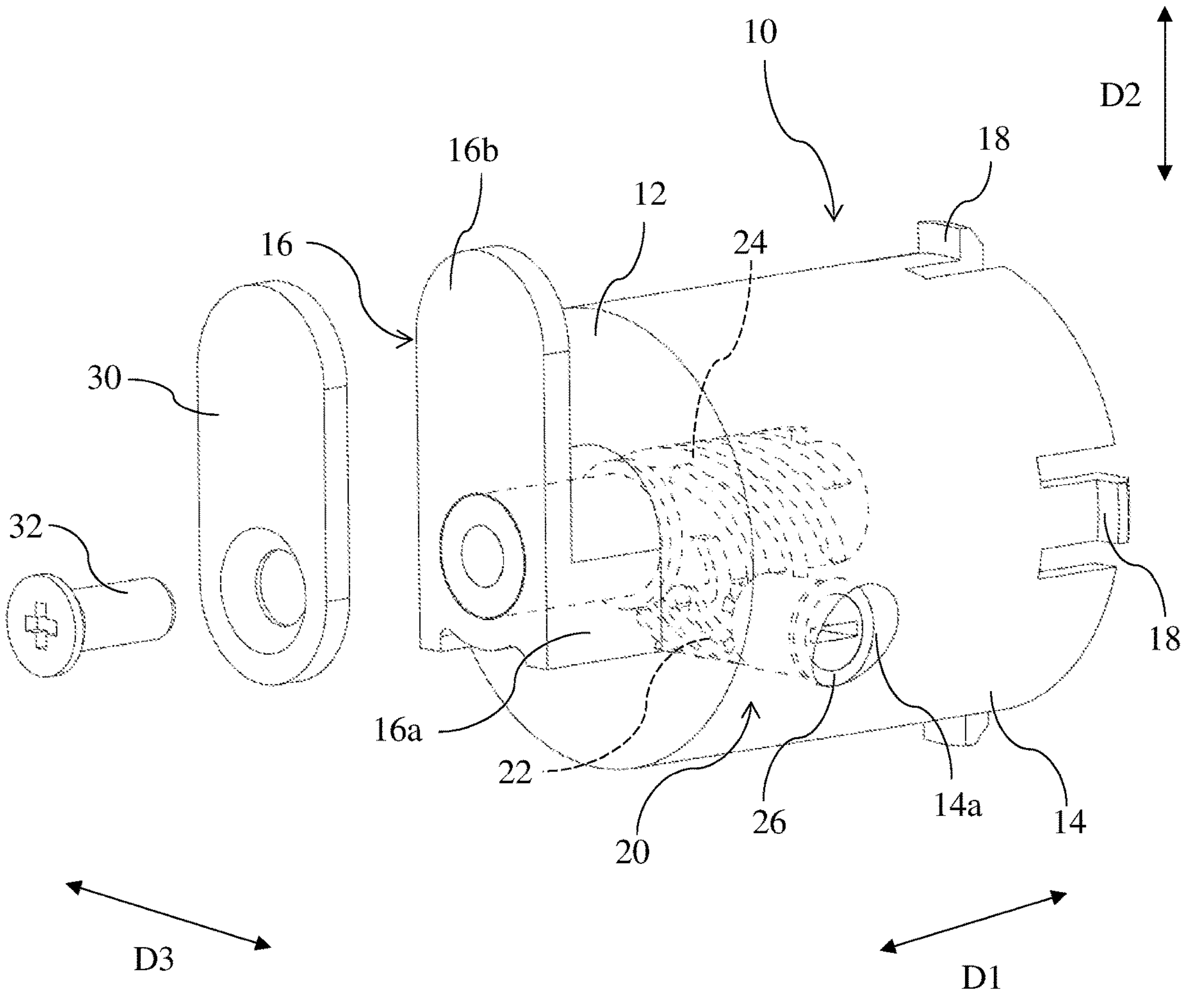
FIG. 3 is a part of cross-portional schematic diagram of the anti-theft hanger shown in FIG. 1 of the present disclosure.

Referring to FIG. 1, FIG. 2 and FIG. 3, the drive module 20 is installed inside the inner shell 10. The drive module 20 comprises an active screw 22, a passive screw 24, and a drive switch 26. The drive switch 26 is fixed on the side wall 14 and exposes from the side wall 14. In this embodiment, the drive switch 26 is positioned within an opening 14*a* in the side wall 14. The drive switch 26 has screw threads, allowing it to thread into the opening 14*a*, thereby securing the drive switch 26 onto the side wall 14.

One end of the active screw 22 is connected to the drive switch 26, and by connecting to the drive switch 26, the active screw 22 is constrained within the inner shell 10. The active screw 22 is positioned within the inner shell 10 along a third direction D3. The third direction D3 can be perpendicular to the first direction D1 and the second direction D2. The passive screw 24 meshes with the active screw 22 and is positioned along the first direction D1 on the active screw 22. One end of the passive screw 24 passes through the fixed plate 12 and the hanging hook 16 of the inner shell 10, thereby mounting the passive screw 24 onto the inner shell 10. The passive screw 24 can rotate relative to the inner shell 10.

The locking plate 30 is positioned on the blocking portion 16*b* of the hanging hook 16 and is connected to the passive screw 24 of the drive module 20, enabling the locking plate 30 to rotate in response to the driving of the drive module 20. The shape of the locking plate 30 corresponds to the shape of the blocking portion 16*b* of the hanging hook. In this embodiment, the shape of the locking plate 30 corresponds to the shape of the blocking portion 16*b*, the locking plate 30 is shaped like a tongue. The anti-theft hanger further includes a locking assembly 32, which is threaded through the locking plate 30 and the hanging hook 16 to secure the locking plate 30 onto the passive screw 24. As the passive screw 24 rotates, the locking plate 30 rotates synchronously.

The outer shell 40 is fitted over the outer surface of the inner shell 10, and covering the drive switch 26. The side surface 46 of the outer shell 40 is equipped with at least one limit slot 42, and a fixed portion 44 is vertically or substantially vertically arranged on the side surface 46 of the outer shell 40, where the substantially vertical includes vertical or angles ranging from 70 to 100 degrees. The limit slot 42 can be two or more, equidistantly placed on the side surface 46, and it is not limited to only one limit slot 42. When the outer shell 40 is fitted over the inner shell 10, the latch 18 corresponds to being positioned within the limit slot 42, and the latch 18 can move within the limit slot 42. In this embodiment, the limit slot 42 is an L-shaped limit slot 42. For clarity, the present application defines the limit slot 42 to include a long groove 42*a* and a short groove 42*b*. The long groove 42*a* extends along the first direction D1, while the short groove 42*b* extends along the second direction D2. The latch 18 can move along the long groove 42*a*. When the latch 18 reaches the junction between the long groove 42*a* and the short groove 42*b*, the inner shell 10 can be rotated clockwise, allowing the latch 18 to enter the short groove 42*b*. This restricts the movement of the latch 18 and simultaneously limits the position of the inner shell 10 within the outer shell 40, thereby securing the inner shell 10 within the outer shell 40. The fixed portion 44 is situated at one end of the outer shell 40, and it is positioned near the hanging hook 16. The fixed portion 44 is perpendicular to the side surface 46 of the outer shell 40.

Figure 4:
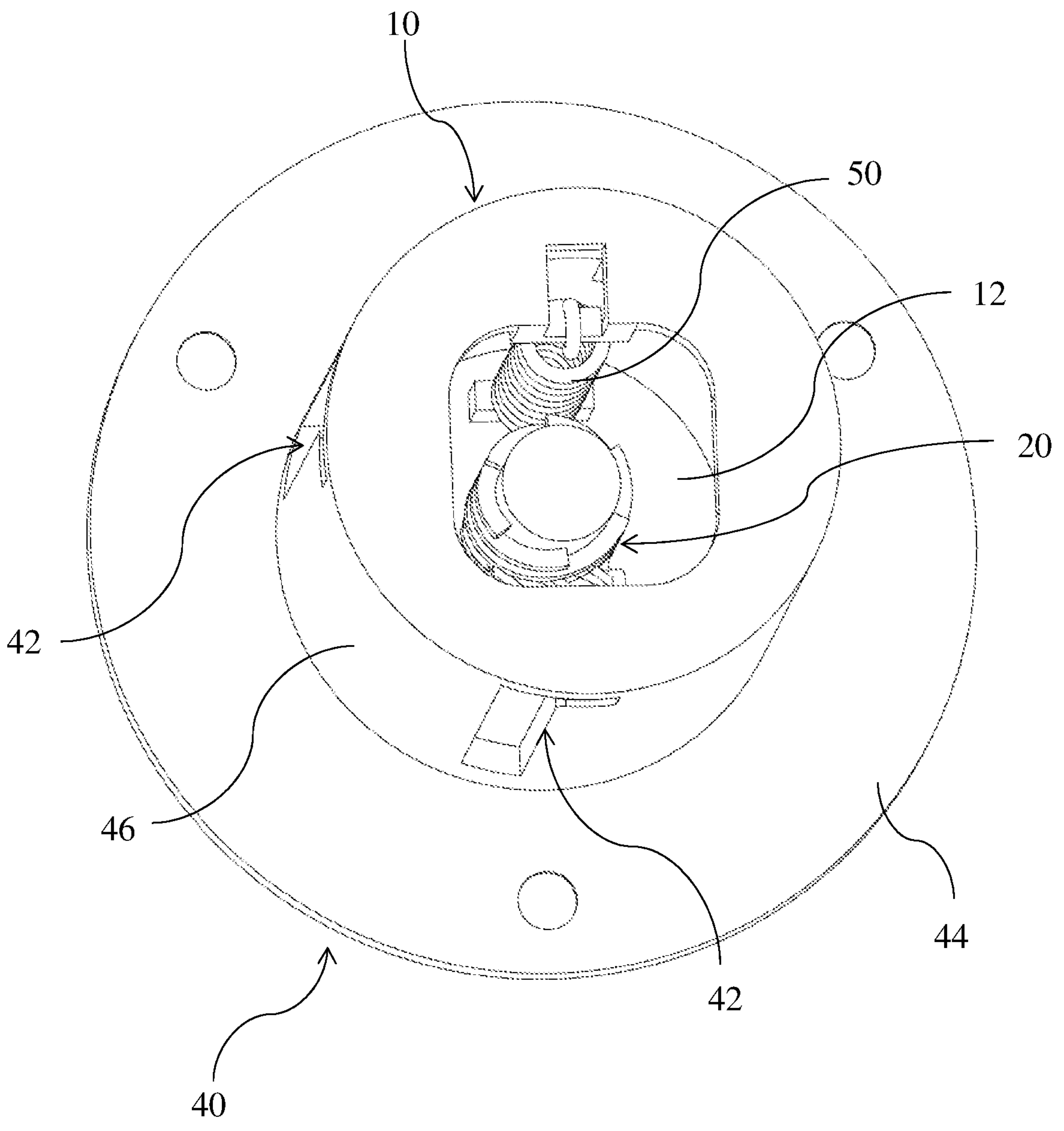
FIG. 4 is a schematic diagram of an embodiment of a method to install an elastic element to the anti-theft hanger shown in FIG. 1.

The elastic element 50 connects the inner shell 10 with the outer shell 40 to limit the movement distance between the inner shell 10 and the outer shell 40, ensuring that there is no looseness between them. Please refer to FIG. 4. In this embodiment, one end of the elastic element 50 is installed on the inner surface of the inner shell 10 and positioned on the fixed plate 12 of the inner shell 10. The other end of the elastic element 50 is installed on the side surface 46 of the outer shell 40 and located at the other end where the fixed portion 44 is situated.

Please refer to FIG. 2. The anti-theft hanger further includes a driving auxiliary tool 70, which can be connected to drive switch 26 to assist in driving the active screw 22. Drive switch 26 can be a simple slot, and driving auxiliary tool 70 can be a plug corresponding to the slot shape. When the driving auxiliary tool 70 is inserted into the drive switch 26 and rotated, it corresponds to driving the active screw 22, thereby driving the passive screw 24 and the locking plate 30 to rotate. Drive switch 26 can be a lock, and driving auxiliary tool 70 can be a corresponding key to unlock the lock, inserted into drive switch 26 to unlock and rotate the active screw 22.

Figure 5:
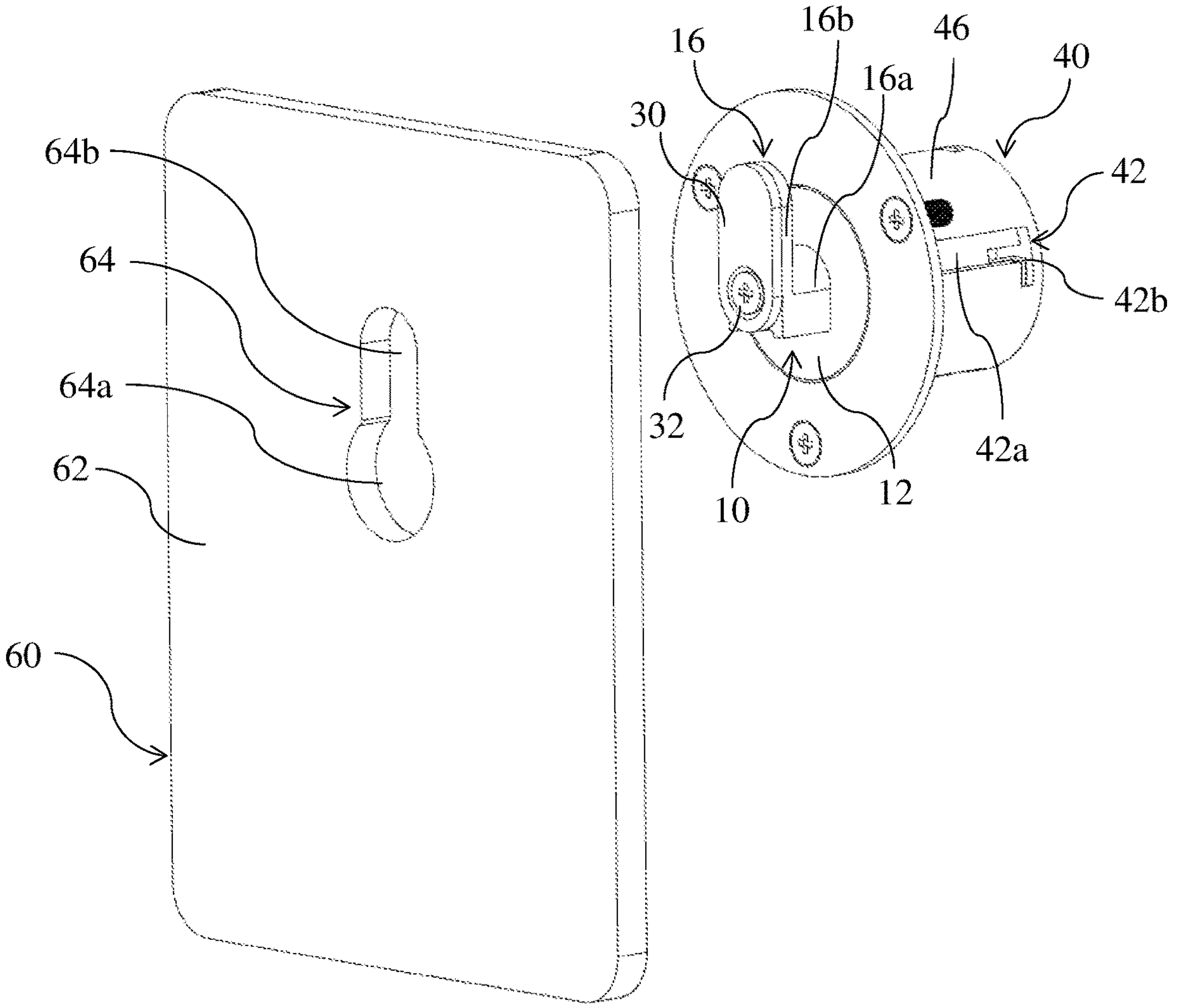
FIG. 5 is a perspective view of an embodiment of a connecting component of the anti-theft hanger shown in FIG. 1.

Please refer to FIG. 5. In this embodiment, the anti-theft hanger further comprises a connecting component 60, which is used to be installed on the item to be hung, providing a connection between the hanging hook 16 and the item to be hung, thereby hanging the item. The item can be a picture frame, clock, router, etc. The connecting component 60 comprises an installation portion 62 and a hanging hole 64. The installation portion 62 is used to be installed on the item, and it can be a component such as adhesive or screws that can be fixed on the item. The hanging hole 64 provides a passage for the hanging hook 16 to connect to the connecting component 60. For ease of understanding, in this embodiment, the hanging hole 64 is defined as a combination of a circular hole portion 64*a* and a tongue hole portion 64*b*, wherein the tongue hole portion 64*b* matches the shape of the hanging part 16*a*. The hanging hole 64 can also be an eight-shaped hole or a gourd-shaped hole, etc., with a narrower middle perforation, which can provide a reinforced fixing effect.

After explaining the structure of the anti-theft hanger in this embodiment, the usage scenario of the present invention is elaborated. When in use, pre-set concavity is made on the wall surface or mounting surface, corresponding to the shape of the side surface 46 of the outer casing 40, allowing the outer casing 40 to be installed within the depressions on the wall. The fixing portion 44 is exposed within the concavity and is parallel to the wall surface. The fixing portion 44 can be secured to the wall surface using screws, adhesive, or other fixing components. The connecting component 60 is installed on the item to be hung via the installation part 62 and can be installed by setting locking screws or adhesive.

Figure 6:
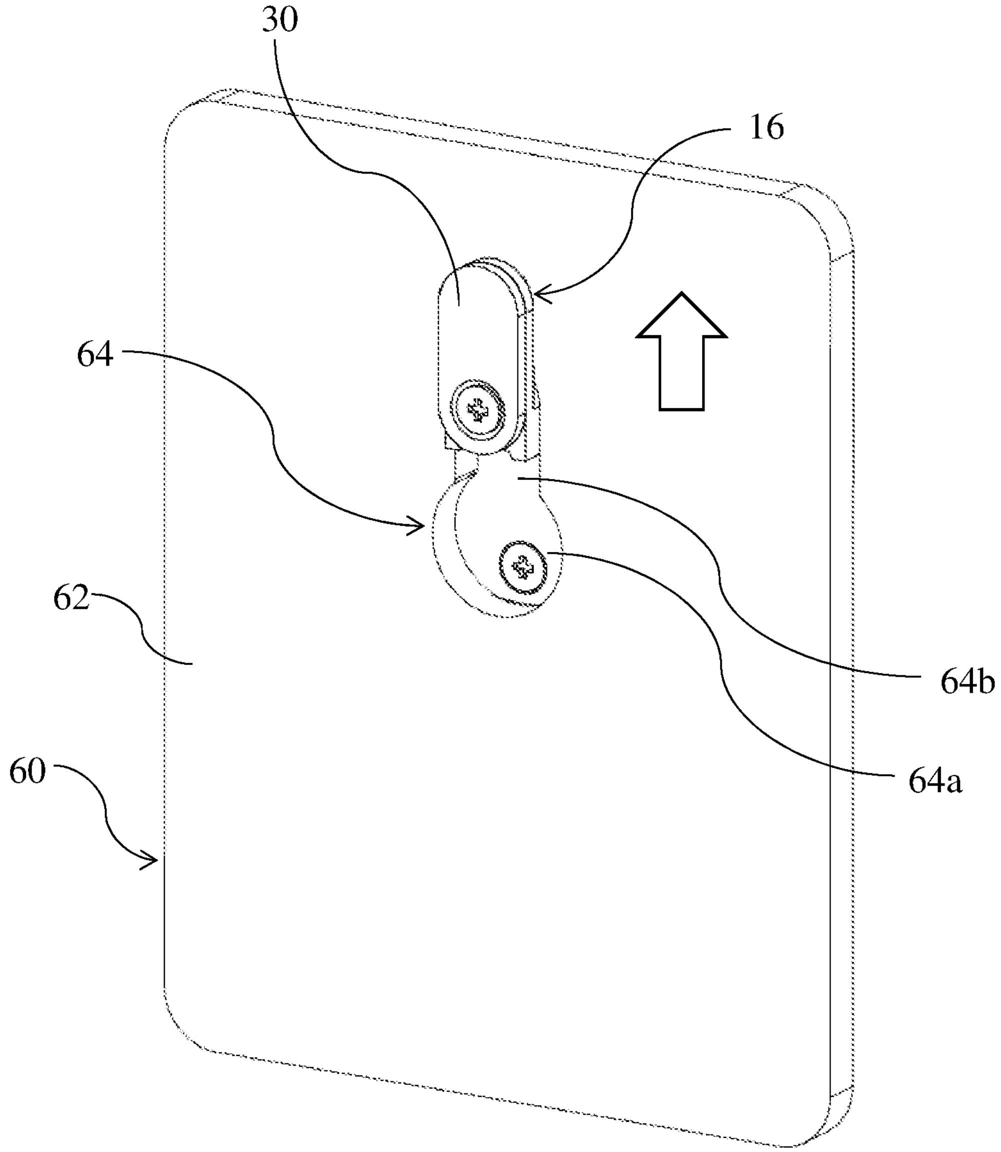
FIG. 6, FIG. 7, FIG. 8 and FIG. 9 illustrate an embodiment of sequential installation states of the anti-theft hanger shown in FIG. 1.

Please refer to FIG. 6. When hanging an item, start by threading the hanging hook 16 through the hanging hole 64. In this embodiment, before entering the hanging hole 64, the hanging hook 16 and the locking plate 30 need to overlap each other so that they can enter the hanging hole 64. After the hanging hook 16 has passed through the hanging hole 64, gravity will cause the item and the connecting component 60 to fall downward, causing the hanging hook 16 to move into the tongue hole portion 64*b*. In this embodiment, the shape of the hanging portion 16*a* will perfectly match the shape of the tongue hole portion 64*b*, providing a point of force application for rotating the inner shell 10.

Figure 7:
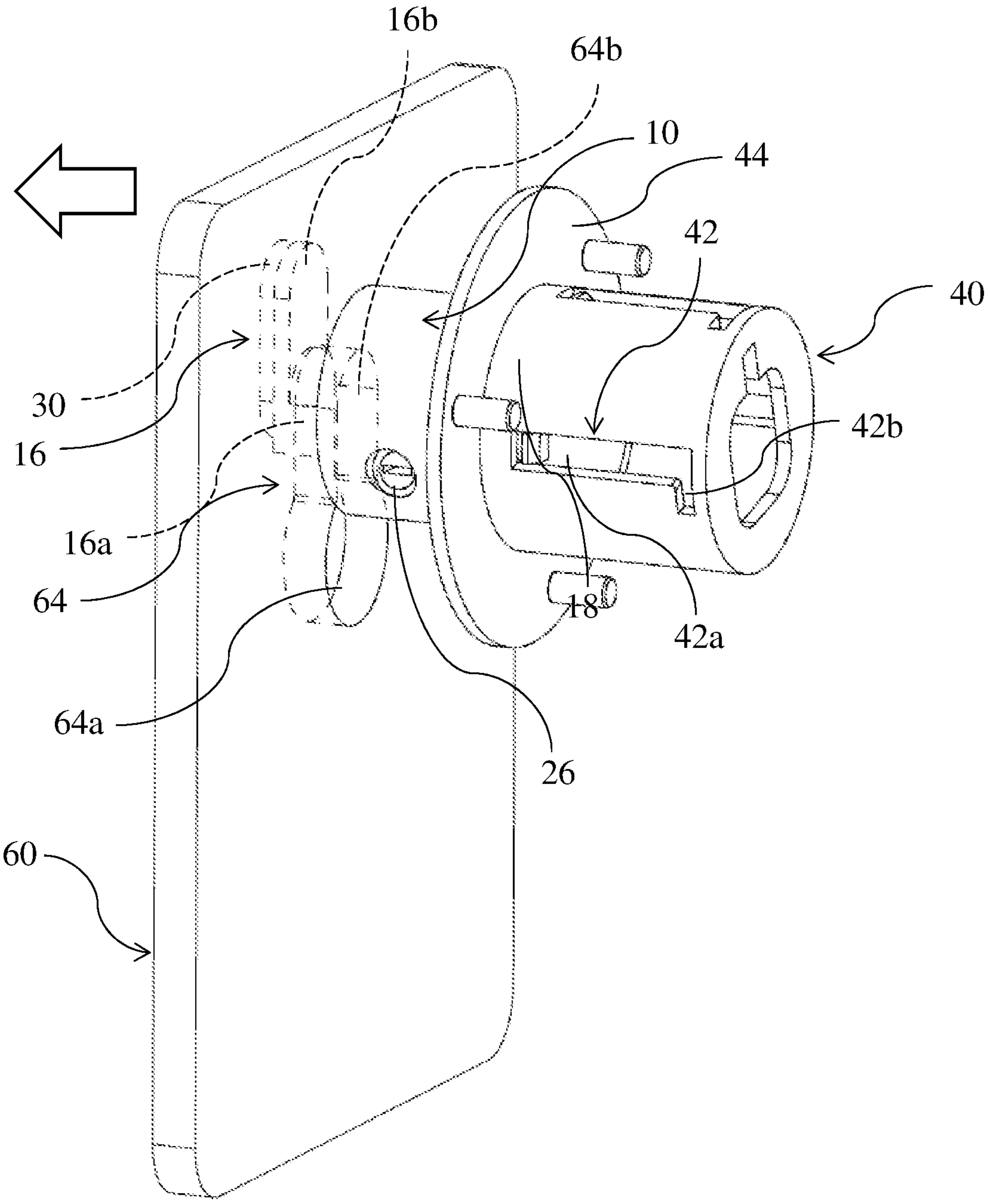

Please refer to FIG. 7. The user rotates the item clockwise, causing the connecting component 60 to rotate. At the same time, force is applied to the hanging portion 16*a* of the hanging hook 16 to drive the inner shell 10 to rotate, causing the latch 18 to leave the short groove 42*b* and move within the long groove 42*a*. Then, the user pulls up the connecting component 60 to pull the inner shell 10 out from the wall and the outer casing 40.

Figure 8:
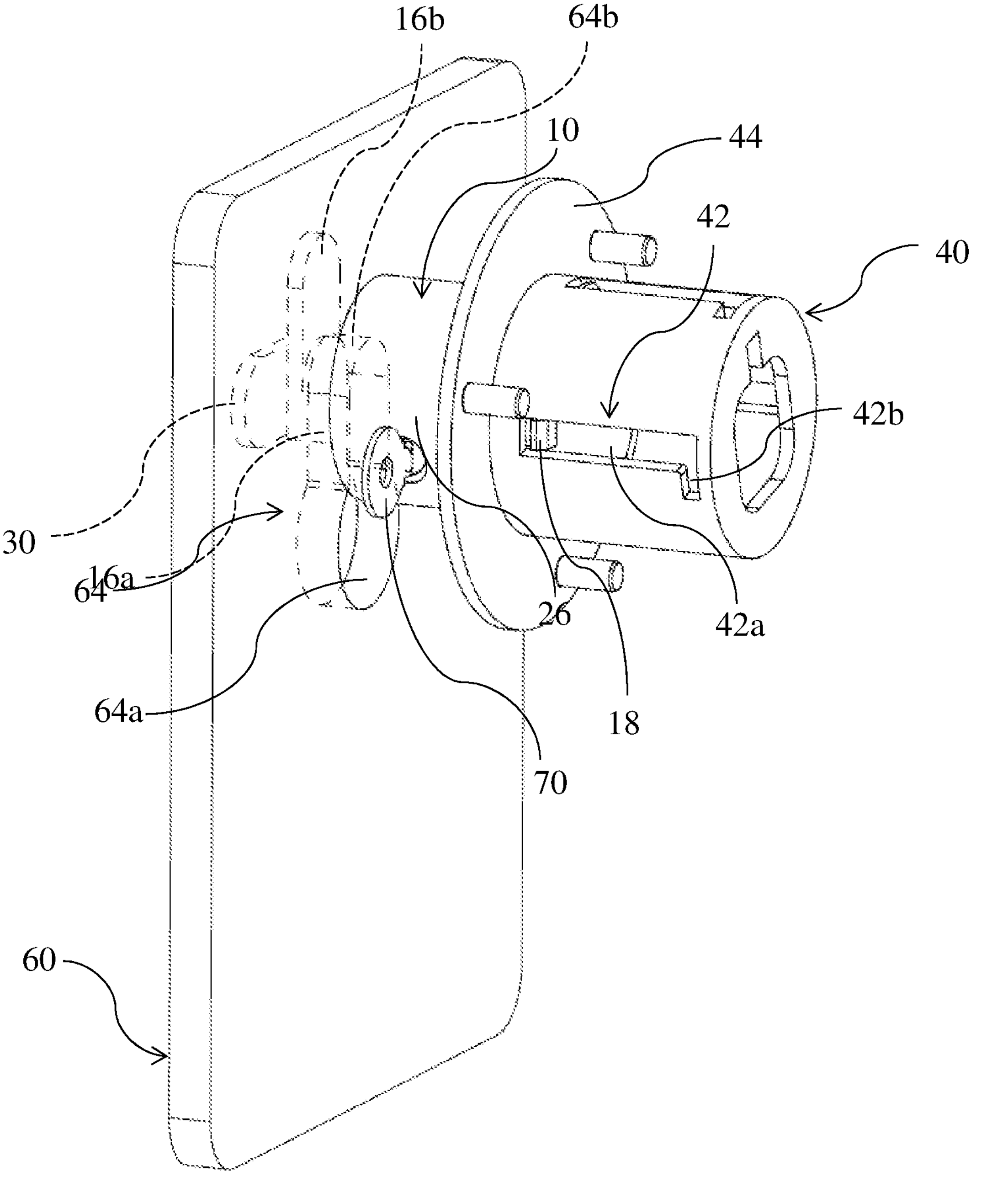

Please refer to FIG. 8. After pulling out the inner shell 10 from the outer casing 40, the driving switch 26 is exposed. The user inserts the driving auxiliary tool 70 into the driving switch 26, thus rotating the driving switch 26 and driving both the active screw 22 and the passive screw 24. As the passive screw 24 rotates, the locking plate 30 simultaneously rotates 90 degrees, blocking the hanging hole 64 and thereby preventing the hanging hook 16 from leaving the hanging hole 64, producing a locking effect.

Figure 9:
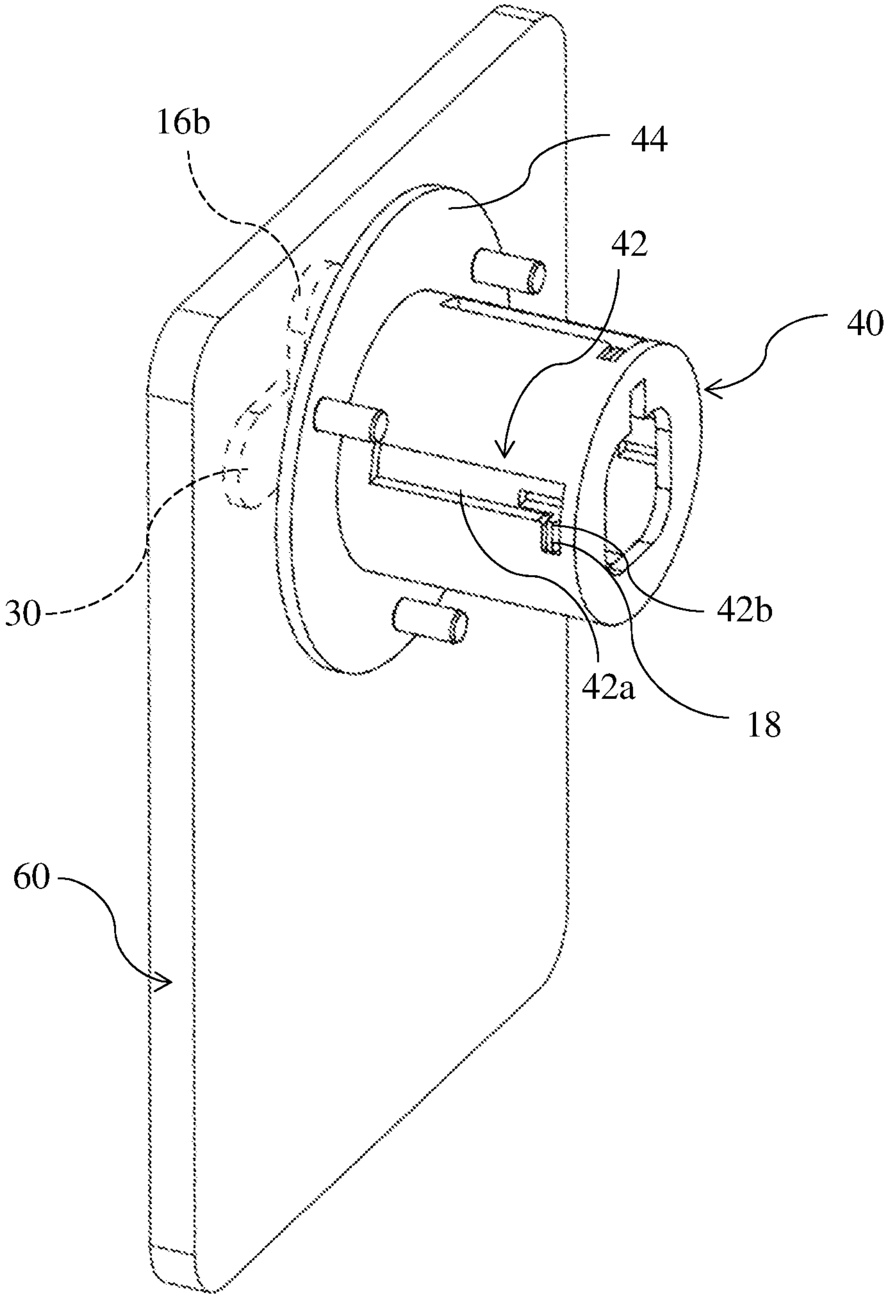
Figure 10:
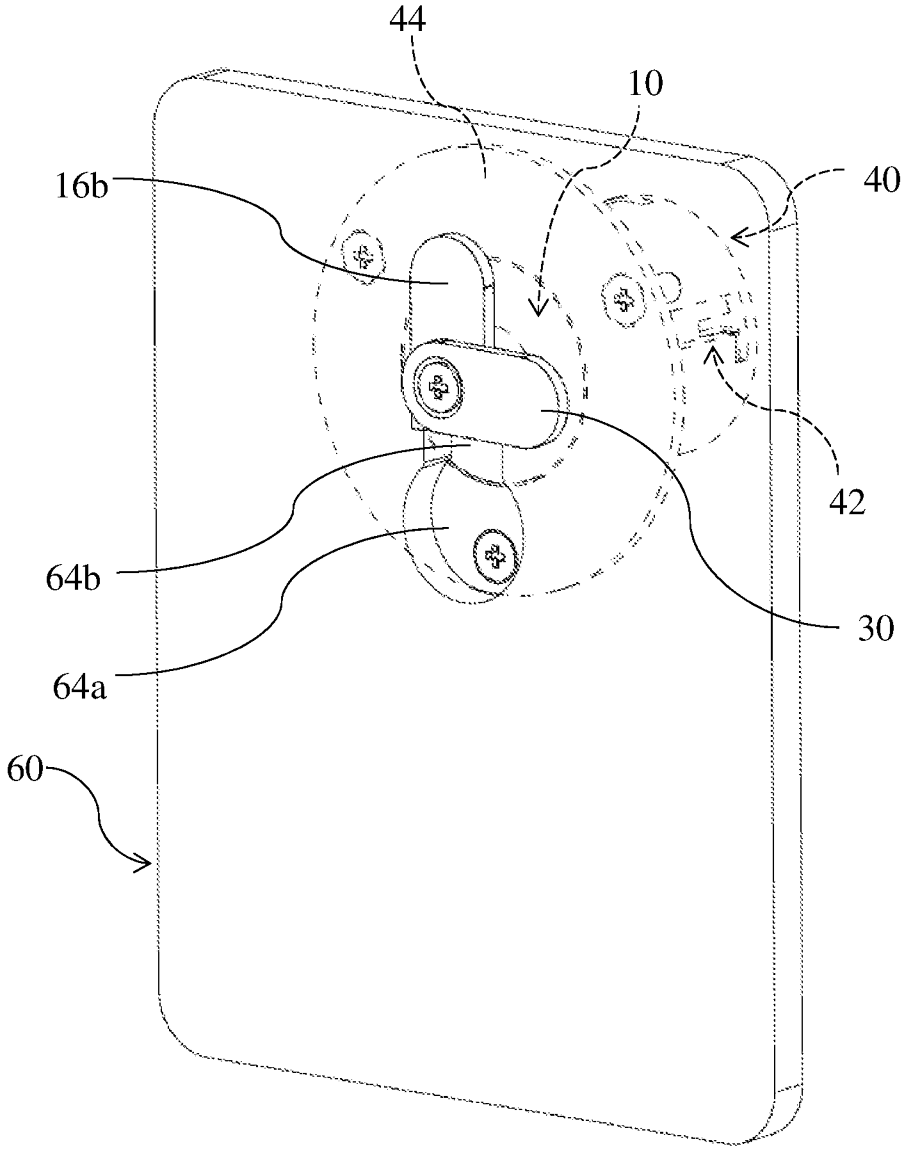
FIG. 10 is a completed installation schematic diagram of another embodiment of an anti-theft hanger of the present disclosure.

Finally, please refer to FIG. 9 and FIG. 10. After removing the driving auxiliary tool 70, the user releases the connecting component 60. Due to the presence of the elastic element 50, the inner shell 10 automatically retracts into the outer casing 40. Next, rotate the item counterclockwise to allow the latch 18 to return to the short groove 42*b*, thereby completing the fixation of the item.

Therefore, this invention can secure the item. Since the driving switch 26 is hidden within the outer casing 40, which is installed within the concavity on the wall surface, this also makes it difficult for thieves to locate the position of the driving switch 26, thus making unlocking. However, for users familiar with the structure, the unlocking process is quite convenient and simple. In summary, this invention offers anti-theft and anti-tampering effects, while also being easy to unlock and dismantle.

Many details are often found in the relevant art and many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An anti-theft hanger comprising:

an inner shell comprising a fixed plate and a side wall, wherein the side wall encircle the fixed plate, a hanging hook is positioned on the fixed plate, and a latch is positioned on the side wall;

a drive module positioned within the inner shell, the drive module comprising a drive switch which is fixed and exposed on the side wall;

a locking plate positioned on the hanging hook and connected to the drive module to receive driving force from the drive module;

an outer shell fitted over the inner shell, at least a limit slot positioned on a side surface of the outer shell, the latch being movable within the limit slot; and an elastic element connecting the inner shell to the outer shell to restrict a relative movement distance between the inner shell and the outer shell.

2. The anti-theft hanger of claim 1, wherein the drive module further comprises:

an active screw secured to the drive switch; and a passive screw engaged with the active screw, one end of the passive screw extends through the fixed plate and the hanging hook, and is connected to the locking plate.

3. The anti-theft hanger of claim 2, further comprising a locking assembly threaded through the locking plate to secure the locking plate to the passive screw.

4. The anti-theft hanger of claim 1, further comprising a connecting component comprising an installation portion and a hanging hole, wherein the installation portion is mountable to an item, and the hanging hook extends through the hanging hole.

5. The anti-theft hanger of claim 4, wherein the hanging hole comprises a circular hole portion and a tongue hole portion.

6. The anti-theft hanger of claim 4, wherein the hanging hole is an 8-shape hanging hole.

7. The anti-theft hanger of claim 1, wherein the outer shell is vertically provided a fixed portion, and the fixed portion is located at a one end of the side surface, near the hanging hook.

8. The anti-theft hanger of claim 7, wherein one end of the elastic element is installed on an inner surface of the inner shell, and fixed to the fixed plate, another end of the elastic element is mounted on the outer shell.

9. The anti-theft hanger of claim 1, wherein a shape of the locking plate corresponds to a shape of the hanging hook.

10. The anti-theft hanger of claim 1, further comprising a driving auxiliary tool connected to the drive switch to assist in driving the active screw.

11. The anti-theft hanger of claim 1, wherein the limit slot is L-shaped.

12. The anti-theft hanger of claim 1, wherein the limit slot comprises a long groove and a short groove, with the short groove positioned vertically to the long groove.

13. The anti-theft hanger of claim 1, wherein the hanging hook comprises a hanging portion and a blocking portion, the hanging portion extends outwardly from the inner shell, the blocking portion is connected to the hanging portion and positioned vertically to the hanging portion.

14. The anti-theft hanger of claim 13, wherein one end of the blocking portion has a curved edge.

15. The anti-theft hanger of claim 1, further comprising a hole positioned on a side wall of the inner shell, and the drive switch protrudes through the hole.

* * * * *